(12) United States Patent
Morgeneyer et al.

(10) Patent No.: US 9,957,420 B2
(45) Date of Patent: May 1, 2018

(54) MULTIPLE-LAYER EDGEBANDING

(71) Applicant: Henkel AG & Co. KGaA, Duesseldorf (DE)

(72) Inventors: Thomas Morgeneyer, Bopfingen (DE); Lutz Pielert, Erfurt (DE); Juergen Lotz, Kiedrich (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 538 days.

(21) Appl. No.: 14/270,656

(22) Filed: May 6, 2014

(65) Prior Publication Data

US 2014/0238593 A1 Aug. 28, 2014

Related U.S. Application Data

(63) Continuation of application No. PCT/EP2012/071676, filed on Nov. 2, 2012.

(30) Foreign Application Priority Data

Nov. 9, 2011 (DE) .......... 10 2011 085 996

(51) Int. Cl.
| | | |
|---|---|---|
| B32B 37/12 | (2006.01) |
| C09J 7/02 | (2006.01) |
| B32B 7/12 | (2006.01) |
| B32B 21/04 | (2006.01) |
| B32B 21/06 | (2006.01) |
| B32B 21/08 | (2006.01) |
| B32B 21/13 | (2006.01) |
| C09J 175/08 | (2006.01) |

(52) U.S. Cl.
CPC .............. *C09J 7/0203* (2013.01); *B32B 7/12* (2013.01); *B32B 21/04* (2013.01); *B32B 21/06* (2013.01); *B32B 21/08* (2013.01); *B32B 21/13* (2013.01); *B32B 37/1207* (2013.01); *C09J 175/08* (2013.01); *B32B 2037/1223* (2013.01); *B32B 2255/08* (2013.01); *B32B 2255/26* (2013.01); *B32B 2255/28* (2013.01); *Y10T 428/2809* (2015.01)

(58) Field of Classification Search
CPC ........... B32B 7/12; B32B 21/04; B32B 21/06; B32B 21/08; B32B 21/13; B32B 37/1207; C09J 7/0203; C09J 175/08
See application file for complete search history.

(56) References Cited

U.S. PATENT DOCUMENTS

| | | | | |
|---|---|---|---|---|
| 6,112,794 A | * | 9/2000 | Hannon | B27D 5/003 |
| | | | | 156/244.27 |
| 6,197,844 B1 | | 3/2001 | Hamrock et al. | |
| 6,207,289 B1 | | 3/2001 | Hoffman et al. | |
| 6,844,029 B2 | | 1/2005 | Okada et al. | |
| 2002/0056938 A1 | | 5/2002 | Hasenkamp et al. | |
| 2003/0003258 A1 | * | 1/2003 | Durso | B27G 11/00 |
| | | | | 428/53 |
| 2004/0132857 A1 | | 7/2004 | Barton et al. | |
| 2004/0247917 A1 | | 12/2004 | Mendes et al. | |
| 2009/0082485 A1 | | 3/2009 | Slark et al. | |
| 2010/0236707 A1 | | 9/2010 | Studer et al. | |
| 2012/0305168 A1 | | 12/2012 | Schmid et al. | |

FOREIGN PATENT DOCUMENTS

| | | | |
|---|---|---|---|
| CN | 1229423 A | 9/1999 | |
| CN | 101490155 A | 7/2009 | |
| DE | 240523 A1 | 8/1985 | |
| DE | 4311830 A1 | 10/1994 | |
| DE | 19907939 A1 | 2/1999 | |
| EP | 0744260 A1 | 5/1996 | |
| EP | 1384559 A1 | 7/2002 | |
| GB | 1489814 A | 10/1977 | |
| JP | 2001146583 A | 5/2001 | |
| JP | 2003126774 A | 5/2003 | |
| JP | 2006507398 A | 3/2006 | |
| JP | 2007084751 A | 4/2007 | |
| JP | 2010284950 A | 12/2010 | |
| WO | 98/15586 A1 | 4/1998 | |
| WO | 02/24421 A1 | 3/2002 | |
| WO | WO 2009077865 A2 * | 6/2009 | ............... C08F 2/48 |
| WO | 2011101494 A1 | 8/2011 | |

OTHER PUBLICATIONS

International Search Report for PCT/EP2012/076176, 3 pages. DIN 53505

\* cited by examiner

*Primary Examiner* — Daniel McNally
(74) *Attorney, Agent, or Firm* — James E. Piotrowski

(57) ABSTRACT

Composite of shaped bodies made from wooden materials with film-shaped substrates, wherein a surface of the shaped body has a first layer comprising a crosslinked radiation-curing hot-melt adhesive, said layer is covered with a second adhesive layer of a hot-melt adhesive, and said second adhesive layer is adhesively bonded to a film-shaped substrate. A method for producing composite shaped bodies of this type is provided, in which method, as one step, the surface is coated with a UV-crosslinkable hot-melt adhesive, and which method makes in-line production of the composite bodies possible.

12 Claims, No Drawings

MULTIPLE-LAYER EDGEBANDING

The invention relates to a composite of a shaped element and a film-shaped second substrate, wherein the shaped element is equipped with a crosslinked coating that can be processed directly after manufacture and can then be adhesively bonded to the second substrate with a second adhesive layer. A method for manufacturing such adhesive composites is also described.

DE 19728556 describes the use of thermoplastic compounds to fill up pores in wood materials. The softening point here is said to be from 140 to 240° C., the compound being moderately or highly crystalline. Thermoplastic compounds are described.

DE 4311830 describes a method for sheathing edges of wood panels or particle-board panels, wherein they are bonded on with an adhesive. EVA, polyamide adhesives, or PVAc adhesives are described as adhesives. These are thermoplastic melt adhesives or dispersion adhesives. In addition, sealants are to be used on the edges, those based on polysiloxanes, polyurethane, or epoxy resins being described. Reactive systems of this kind require a reaction time, which usually can be more than 24 hours, for sufficient crosslinking.

DE 19630270 describes a method for finishing wood materials, wherein the surface is treated with coating material based on polyurethanes, polyesters, polymethacrylates, or epoxies, wherein these are crosslinkable systems that are smoothed and cured with a heatable metal block.

WO 98/15586 describes the use of two-component polyurethane systems for the shaping of particle-board panels, fiber panels, or plywood panels. The reactive two-component system is intended to have a high viscosity from 150 to 350 Pas, or it must exhibit a rapid buildup in thixotropy. Polyurethane systems of this kind require a considerable reaction time for crosslinking, or they are cured in accelerated fashion by means of elevated temperature.

WO 2009/077865 describes, as a melt adhesive, NCO-free compositions that are radiation-curable. The coating agents can also contain fillers such as silicon dioxide. Areas of utilization that are described are covering layers for furniture, parquet, panels, doors, and similar materials. Coatings on wood, plastic, glass, veneer, or textile substrates are also described. Layer thicknesses below 200 µm are used in particular.

It is known that in processing industries, wood materials, based e.g. on particle-board panels, MDF panels, wood, etc. are permanently adhesively bonded to other substrates. On the one hand, permanent and weather-resistant adhesive bonds are to be obtained in this context; another problem is the requirement that maximally smooth and homogeneous surfaces are to be obtained. It is known in this context that faults in the carrier substrate are often replicated on the bonded substrates, for example on films.

In order to obtain a good join and at the same time a high-quality surface, it is known that a variety of liquid or melt-type adhesive compounds can be applied onto the carrier substrate. Thermoplastic materials have the disadvantage, however, that they need to cool, and that while warm they can soften and their bonding properties can change. The known reactive one- or two-component systems based on polyurethanes or epoxies have the disadvantage that they require a crosslinking reaction constituting an addition reaction. Addition reactions of this kind need to be accelerated with a catalyst, or the compound being crosslinked is heated. Heating in this context can damage the substrate. If this step is omitted, the curing of such crosslinking systems is tedious, usually requiring more than 24 hours. If very fast-reacting systems are employed, this produces in practice the difficulty that they have a short pot time, i.e. they can be processed for only a short time, after which the adhesives are no longer suitable and the application equipment must then also be carefully cleaned.

It is commonly known that radiation-crosslinking systems based on unsaturated monomeric or oligomeric compounds crosslink quickly with sufficient irradiation. Such materials often produce a clear surface, so that they are used as a lacquer and coating agent. A disadvantage of such materials, however, is that they often can be applied only in thin layers, since otherwise sufficient crosslinking by means of radiation is not possible. Without sufficient crosslinking, however, it is not possible to generate the strength properties necessary for further processing.

The object of the present invention is therefore to supply a composite article and a method for manufacturing it, wherein the article comprises, on a carrier material, a surface layer that crosslinks quickly and develops sufficient hardness that it can quickly be further processed and processed for shaping purposes. In addition, substances objectionable in terms of health, for example monomeric isocyanates or solvents, are to be avoided. This layer must furthermore be adhesively bonded, with an adhesive, to a film-shaped substrate, wherein a bond that is as temperature- and moisture-stable as possible is to be produced. The processing steps are to be capable of execution as rapidly as possible, in order to enable in-line production.

The object is achieved by supplying a composite of shaped elements made of wood materials and film-shaped substrates, wherein a surface of the shaped element is coated with a first layer made of a crosslinked UV-curing melt adhesive, this layer is covered with a second adhesive layer of a melt adhesive, and this is adhesively bonded to a film-shaped substrate.

A further subject of the invention is a method for manufacturing such composite elements, in which a rapid sequence of the various working steps is possible. A further subject of the invention is the use of pigmented radiation-crosslinking melt adhesive compositions as a primer for porous or mechanically less stable wood materials in order to generate substrate surfaces suitable for adhesive bonding.

The composite element comprises two different substrates: a shaped element made of wood or wood materials, and a flexible film-shaped substrate. Dimensionally stable shaped elements can be used as a first substrate. These can be made up of wood, wood materials such as particle-board panels, plywood, MDF or OSB panels, and fiber panels; the shaped elements can also be ones made of several different materials. Pretreatment of the substrate surface is not necessary. It should, however, preferably be free of dust-type particles, and grease-free. It can also already be mechanically processed. These processed shaped elements often have a porous surface. Flexible substrates are used as a second substrate. These can be, in particular, flexible film-shaped substrates made of wood, paper, or plastic, such as veneers, film coatings or edge strips, for example veneer films, plastic strips, or plastic films. These can also be imprinted, embossed, or coated, and multi-layer substrates can also be used.

At least one first layer of a radiation-crosslinking adhesive is applied at least in part onto the shaped element. The first adhesive suitable according to the present invention is solid at room temperature (25° C.). It is intended to melt at higher temperatures, for example at approximately 80 to 150° C. The adhesive should furthermore preferably contain several compounds that contain unsaturated groups which are crosslinkable by means of actinic radiation. The crosslinking density can be influenced by way of the quantity of groups and the number per molecule. It is useful according to the present invention for the adhesive not to crosslink via polyaddition or polycondensation. These are not suitable for fast crosslinking.

The adhesive suitable according to the present invention for bonding the prepared surfaces of the shaped elements is a radiation-crosslinkable melt adhesive that is intended to be free of isocyanate groups. It is preferably made up of a polymer component, an oligomer component, and/or a monomer component, wherein each of these components must comprise at least one functional group that is polymerizable by radiation. The melt adhesive additionally contains at least one photoinitiator; it can also contain further additional additives and adjuvants. It is useful in particular if the melt adhesive also contains pigments and/or fillers.

An adhesive suitable according to the present invention contains at least one polymer component that has a molecular weight ($M_N$, number-average molecular weight as determinable via GPC) of more than 2000 g/mol. The polymer is intended in particular to have a $M_N$ above 5000, preferably below 100,000 g/mol. The polymer component is to contain polyurethane segments and poly(meth)acrylate segments, and additionally at least one functional group that is crosslinkable under UV radiation. The polymer component can be made up of a mixture of radiation-crosslinkable polyurethanes and poly(meth)acrylates, but it is also possible for them to be present in chemically bound fashion and as a crosslinkable block copolymer.

The block or polymer that comprises polyurethane groups can be manufactured from the usual raw materials known in polyurethane chemistry. These are, for example, aliphatic or aromatic polyisocyanates, in particular diisocyanates, that are reacted with polyol compounds.

Suitable polyols for such polyurethane skeletons have a molecular weight from 400 to 10,000 g/mol. Examples thereof are polyether polyols or polyester polyols. Polyester polyols can be produced, for example, by reacting dicarboxylic acids with diols, for example aliphatic, aromatic, or unsaturated di- or tricarboxylic acids, dimer fatty acids, wherein the carboxylic acids are to have 2 to 36 carbon atoms. Examples of alcohols are low-molecular-weight alcohols having a molecular weight below 1000 g/mol, for example aliphatic, cycloaliphatic, branched, or aromatic diols. It is also possible to use polyoxyalkylenediamines that are known, for example, by the commercial name Jeffamine.

Polyether polyols that can be used are the reaction products of polyfunctional alcohols with ethylene oxide, propylene oxide, and/or butene oxide. Diols such as ethylene glycol, propylene glycol, butanediols, or hexanediols are suitable in particular. Homopolymers, mixed polymers, or block copolymers preferably of ethylene oxide or propylene oxide can be used. The reaction products of trifunctional alcohols such as glycerol, trimethylolethane, and/or trimethylolpropane are also suitable at least in portions. Polyether polyols having a molecular weight from 500 to 10,000 g/mol, preferably 500 to 5000 g/mol, are particularly suitable. Depending on the molecular weight desired, addition products of only a few mol of ethylene oxide and/or propylene oxide per mol, or of more than a hundred mol of ethylene oxide and/or propylene oxide, with low-molecular-weight polyfunctional alcohols can be employed.

NCO-containing polyurethane prepolymers are produced from corresponding starting materials by reaction with an excess of isocyanates; the prepolymers are then reacted with compounds that comprise a radiation-crosslinkable group and additionally a group reactive with the isocyanate group. Examples of such compounds are hydroxy-, amine-, or thio-functionalized (meth)acrylates, vinyl ethers, or vinyl silanes.

The second polymer or block is made up of poly(meth)acrylates. These can be linear or branched, and the glass transition temperature ($T_g$, determined by DTA per DIN 53765) is to be between −48° C. and 105° C., in particular between 15 and 85° C. These polymers can be produced by copolymerization of alkyl(meth)acrylate monomers. Examples thereof are esters of (meth)acrylic acid with $C_1$ to $C_{12}$ alcohols. Further suitable monomers are (meth)acrylic esters with ethylene glycol ethers or propylene glycol ethers. It is also possible to employ (meth)acrylate-based comonomers that additionally comprise epoxy, amine, or preferably OH— or COOH— groups.

Methods for manufacturing such poly(meth)acrylates are commonly known, for example by radical polymerization in solvents, as an emulsion or suspension, or in substance. It is possible to equip these poly(meth)acrylates, by polymer-analogous reaction, with unsaturated functional groups that are suitable for subsequent radiation crosslinking.

The radiation-crosslinkable polyurethane polymers and poly(meth)acrylate polymers can be mixed with one another after they are manufactured. It is also possible, however, for them to be mixed with one another prior to functionalization with the unsaturated groups. It is moreover possible, for example, for OH groups of the polyacrylates to react with isocyanate groups that are still present; this results in block copolymers. The latter are then functionalized with the radiation-crosslinkable groups necessary according to the present invention. Block copolymers having polyurethane and poly(meth)acrylate segments are particularly suitable. The polymers are preferably intended to contain two to six radiation-reactive groups.

A melt adhesive according to the present invention can furthermore contain an oligomeric component. Oligomeric components have an $M_N$ from 500 to 5000 g/mol and carry at least two radiation-crosslinkable functional groups, preferably 2 to 6 functional groups. Preferred reactive groups are acrylate or methacrylate groups. These can be known urethane acrylates, polyester acrylates, epoxy acrylates, melamine acrylates, etc., or mixtures thereof. Epoxy acrylates or polyester acrylates are particularly preferred. Oligomeric components of this kind are commercially obtainable. It is preferred for them to have a high level of functionality and to contain, for example, more than two unsaturated. This results in an elevated crosslinking density for the crosslinked layers.

The melt adhesive according to the present invention can moreover contain monomeric components that comprise only one unsaturated group. These have a molecular weight from 100 to 1000 g/mol. They can be known mono(meth)acrylate derivatives, for example esters of (meth)acrylic acid with monovalent alcohols. Also suitable are aliphatic, cycloaliphatic, and/or aromatic alcohols having an OH group, monolaterally etherified polyethylene, polypropylene, polybutylene glycols. Esters with aliphatic alcohols that carry a further OH group in the alkyl residue are also suitable. Reaction products based on polyether polyols with (meth)acrylic acids having a molecular weight ($M_N$) from 200 to 1000 g/mol are particularly suitable.

The acrylate oligomers or monomers can preferably additionally also contain polar groups, for example COOH groups or in particular OH groups.

A melt adhesive suitable according to the present invention can also comprise further additives. These are, for example, waxes, resins, adhesion promoters, stabilizers, antioxidants, photoinitiators, flow promoters, dyes, pigments, plasticizers, or other known adjuvants.

Photoreactive substances are contained according to the present invention in the radiation-crosslinkable adhesive. From 0.02 to 5 wt % of at least one photoinitiator, photosensitizer, and/or regulator molecule can be added. In the preferred case of irradiation with UV radiation, at least one photoinitiator is contained in the coating agent according to the present invention in a quantity from 0.1 wt % to 3 wt %. All commercially usual photoinitiators that are compatible with the coating agent according to the present invention, i.e. that result in largely homogeneous mixtures, are suitable in principle in the context of the present invention. Photofragmenting initiators or cationic initiators can also be used. These are intended to bring about crosslinking of the coating according to the present invention under irradiation.

Added resins produce additional tackiness and improve the compatibility of the components. They are employed in a quantity from 0 to 40 wt %, preferably up to 20 wt %. Waxes can optionally be added to the adhesive. The quantity is to be from 0 to 20 wt %, in particular from 0 to 10 wt %. The wax can be of natural, chemically modified, or synthetic origin. Plasticizers can likewise be contained. The quantity is up to 20 wt %, preferably from 0 to 10 wt %. Suitable plasticizers are oils, esters of carboxylic acids, or hydrocarbons.

Nonreactive, finely particulate inorganic minerals are suitable as fillers and/or pigments; these can be ground, precipitated, and/or surface-treated. Examples are chalk, coated chalk, lime powder, calcium magnesium carbonates, aluminum oxides and hydroxides, silicic acid, quartz, titanium dioxide, barium sulfate, sodium silicates or aluminum silicates, zeolites, bentonites, glass, ground minerals, provided they are present as powders. The particle size is to be between 1 and 500 μm, in particular between 3 and 200 μm. Nanoscale fillers, for example based on $SiO_2$ or $TiO_2$, can also be employed. The selection and quantity are to be such that the necessary radiation-induced reaction is not impaired. The quantity of pigments is to be from 10 to 50 wt % of the composition, in particular 20 to 40 wt %. Transparent fillers are particularly suitable here, for example quartz, feldspar, or nepheline-containing minerals; the radiation sensitivity of the initiator can also be coordinated with the filler.

Included among the stabilizers, in particular UV stabilizers, or antioxidants usable as additives in the context of the invention are phosphites, phenols, high-molecular-weight sterically hindered phenols, polyfunctional phenols, sulfur- and phosphorus-containing phenols or amines.

Further nonreactive thermoplastic polymers can also be added, in small quantities up to a maximum of 10 wt %, to the melt adhesive according to the present invention. These further polymers can influence properties of the coating agent such as cohesion, viscosity, adhesion, elasticity. These can be polymers known to one skilled in the art, such as polyacrylates or nonreactive polyolefins and copolymers.

A particularly suitable adhesive composition contains 60 to 95 wt % polyether polymers and/or polyester polymers having at least one unsaturated group, 5 to 40 wt % oligomers and/or monomers having radiation-crosslinkable groups, 0.1 to 20 wt % additives, in particular photoinitiators, as well as 10 to 40 wt % fillers/pigments. The sum of the constitutes is to yield 100 wt %. The aforementioned particularly suitable raw materials can be selected individually or together.

A melt adhesive according to the present invention can be produced from the aforementioned constituents using known methods. The constituents are preferably selected so that the adhesive has a viscosity from 1000 to 20,000 at a temperature of 130° C., in particular from 2000 to 10,000 mPas at 80 to 120° C. Both here and hereinafter, the viscosity is that which is determined with a Physica Rheolab MC 1 viscometer, specifically using a plate/plate arrangement with a 0.2 mm gap and a shear rate of 20 s$^{-1}$. Radiation-crosslinkable adhesives that contain a radiation-crosslinkable polymer system as described in WO 2009/077865 are particularly suitable.

A subject of the invention thus relates to the use of such suitable radiation-crosslinkable pigmented melt adhesives to consolidate or pre-coat wood material surfaces for adhesive bonding with flexible substrates.

The radiation-crosslinkable melt adhesive usable according to the present invention is employed as a surface coating for the shaped element. It can be applied onto one or more substrate surfaces that are to be bonded to a second substrate. It is necessary for the melt adhesive to be adjusted to a suitable viscosity by melting. This viscosity is selected so that penetration into the porous surface is possible. Coating methods for such substrates and adhesives are known to one skilled in the art. This can occur, for example, by extrusion through a slit nozzle, by roller application, or by blading; in particular, the adhesive is applied as a melt through a nozzle into the surface with pressure. If the viscosity is set too thin, the adhesive sinks into the cavities and pores of the wood material, and a smooth surface is not obtained. If the viscosity is set too high, only the surface becomes coated and anchoring into the wood material is not obtained. It is advantageous if the melt forms a layer on and in the pores and cavities before it solidifies. The layer thickness of the adhesive coating is to be up to 5 mm, preferably 1 to 4 mm. In this context, the radiation-crosslinkable also penetrates into the pores of the surface.

After application it is optionally also possible for the applied layer to be additionally smoothed. Directly after application, the layer is crosslinked by irradiation. This can be done using apparatuses known per se; UV radiation is particularly suitable. Irradiation is to be carried out for a period from 0.3 sec to 15 sec, in particular up to 10 sec. The quantity of irradiation also depends on the intensity of the radiator and its distance from the layer to be crosslinked. Crosslinking with UV radiation is preferred in the context of this invention. Irradiation of the coating agent according to the present invention with UV radiation takes place in particular at a wavelength in the range from 200 nm to 450 nm. The UV radiation is generated using known apparatuses. UV-LED radiators that generate a monochromatic UV radiation are particularly suitable, however; a high radiation density and good crosslinking at the bottom of the layer can thereby be ensured.

After crosslinking of the coating-agent layer, the latter can be mechanically processed so that said first layer of the crosslinked radiation-curing melt adhesive is profiled and/or shaped. The hardness (as Shore hardness D [DIN 53505]) is to be above 50. Known methods such as milling, grinding, or polishing can be used. Mechanical processing generates heat, but this does not result in any negative effect on the crosslinked layer, and the tools are also not adhesively bonded and negatively affected. In this method step, the surface to be adhesively bonded is brought into the intended shape. This method step can occur immediately after crosslinking of the adhesive layer. Dust and particles can be removed from the surface thereafter if necessary.

In the method according to the present invention, a second melt adhesive is applied onto that surface of the shaped element which is pre-processed in the first method step. These melt adhesives are crosslinking or non-crosslinking. Melt adhesives of these kinds are known; many different types can be employed provided a sufficiently stable adhesive bond is obtained. Examples of non-crosslinking melt adhesives are those which contain a nonreactive solid polymer, for example polyesters, polyacrylates, EVA, or polyolefins. Suitable reactive melt adhesives are those which solidify physically and then crosslink via hydrolyzable groups. These can be, for example, polyurethane adhesives having silane groups or having NCO groups. Such melt adhesives can additionally contain additives known per se that, for example, improve the adhesion, melt stability, a weathering stability parameter, or other requisite properties of the melt adhesive.

NCO-containing polyurethane melt adhesives are particularly suitable for manufacturing a composite shaped element according to the present invention; they exhibit good adhesion to the first layer and to the second substrate. Such melt adhesives are known to one skilled in the art, and they are commercially obtainable.

Methods for applying such melt adhesives are likewise known. These adhesives are heated, optionally with moisture excluded, to a temperature between e.g. 80 and 180° C. The adhesives then melt, and can be applied onto the surface to be coated using known equipment, for example by blade, nozzle, or roller application. In accordance with the method according to the present invention, the adhesive layer is selected so that a layer thickness preferably from 50 to 500 μm is obtained. Immediately after application, the second substrate (flexible substrate) is applied onto the adhesive layer. The substrates can be pressed against one another. Adhesion between the two substrates is produced by the cooling of the melt adhesive. This adhesion is in any event sufficient that further processing of the coated parts can be performed. In the case of reactive melt adhesives they also continue to crosslink, which results in particularly good and stable joining of the two substrates.

An improvement in the processing process is achieved thanks to the pre-coating of the shaped parts based on wood materials with the first radiation-curable melt adhesive according to the present invention. The rapid final curing by means of radiation-curing binding agents ensures that good mechanical stability of the surfaces quickly results. The coated substrate can then immediately be sent on for surface processing. Process heat occurring in that context does not result in damage to the substrate surface; shrinkage phenomena, as in the case of thermoplastic coatings, are avoided. It has moreover been found that the adhesion of the second melt adhesive is improved by means of the pigment-containing first layer. The processing speed is increased, since long holding times for completion of the known reactions are not necessary. In-line coating and bonding of the substrates is possible.

Irregularities and pores in the substrate can be compensated for by using a rapidly crosslinkable radiation-curing coating agent. UV-crosslinking of the adhesive layer is possible even with a greater layer thickness. The first layer exhibits high mechanical stability in terms of compression. After adhesive bonding, the second substrate exhibits a smooth surface for the adhesive composite made up of the shaped element, adhesive layers, and second substrate; faults in the substrate are also covered. On this first layer, good adhesion to the second adhesive layer is produced. No delamination between the individual layers is observed even upon storage or when stressed by moisture.

ADHESIVE EXAMPLE 1

A polyurethane was produced from:
25 g PPG 2000, 5 g saturated polyester diol with OH value=30 polyester (Dynacoll 7360), 20 g polyacrylate from methyl methacrylate/butyl acrylate copolymer, molecular weight approx. 60,000 g/mol (Degalan LP 65/12), together with 1.5 Irganox 1010 are dissolved hot (at 130° C.) while stirring.

5 g IPDI is then added, as well as 0.1 phosphoric acid and 0.5 DBTL, and reaction occurs at approx. 100 to 110° C.

NCO value: approx. 1.2%.

Viscosity: 30,000 mPas (at 110° C.).

To this, 7 g OH-functionalized acrylate ester (Bisomer HEA) and 6 g of a difunctional acrylate oligomer (Ebecryl 3700) and 12 g tetrafunctional acrylate (Sartomer SR 444) are added.

NCO value: 0.

30 g ground nepheline syenite is added, homogenized and degassed, and the volatile constituents are removed.

Irgacure 819 (0.75 g), Additol HDMAP (0.75 g), and Stabilisator UV22 (0.2 g) are then mixed in.

The resulting product had a viscosity of approx. 15,000 mPas (110° C.).

It contained no isocyanate groups.

The molecular weight (MN) was approx. 8000 g/mol.

Shore D 70.

METHOD EXAMPLE 2

A commercially usual particle-board panel is coated on the narrow side with a melt adhesive according to Example 1 at 110° C. The application pressure of the nozzle against the edge is approx. 20 bar, application quantity approx. 230 g/m$^2$.

A coating is produced that has penetrated approx. 3 mm into the pore structure and forms a continuous surface.

Immediately thereafter the adhesive layer is irradiated with a UV lamp (0.9 sec, 200 W/cm) and crosslinked.

The cured layer is processed immediately thereafter using a milling head.

Onto this surface a reactive polyurethane adhesive (Purmelt RS 270/7) is applied (approx. 75 g/m$^2$), and a thin PVC edge is bonded on immediately thereafter.

The temperature resistance of the adhesive bond is more than 150° C.

The pores of the substrate are no longer visible.

The running smoothness of the surface is smoother and quieter than a corresponding comparison with no UV coating compound.

The working steps can be carried out immediately after one another.

The invention claimed is:

1. A composite shaped element comprising wood materials and a film-shaped substrate, wherein a surface of the shaped element comprises a first layer of a crosslinked, radiation-cured melt adhesive, this layer being covered with a second adhesive layer of a hot melt adhesive, and this second adhesive layer being adhesively bonded to a film-shaped substrate.

2. The composite according to claim 1, wherein the radiation-curing adhesive is a UV-crosslinking adhesive containing 60 to 95 wt % polyester polymers and/or polyether polymers having at least one radiation-curing functional group, 5 to 40 wt % oligomers having at least two radiation-curing groups and/or monomers having one radiation-curable group, 0.1 to 20 wt % additives comprising photoinitiators.

3. The composite according to claim 2, wherein the UV-crosslinking adhesive further contains 10 to 50 wt % fillers or pigments, wherein the sum of all constituents is to yield 100 wt %.

4. The composite according to claim 1, wherein the first layer of the crosslinked radiation-curing melt adhesive is profiled and/or shaped.

5. The composite according to claim 1, wherein the second adhesive layer is made up of a crosslinked reactive polyurethane melt adhesive.

6. The composite according to claim 1, wherein the wood material is selected from wood, particle board, MDF panel, and/or the film-shaped substrate is selected from plastic film, paper substrate, veneer film, or plastic edge strip.

7. A method for manufacturing a composite according to claim 1, comprising the steps of:
coating a surface of a shaped element with a radiation-curable melt adhesive;
crosslinking the adhesive layer with actinic radiation;
optionally, mechanically processing the crosslinked surface;
applying a second melt adhesive onto the processed surface;
adhesively bonding the first substrate to a film-shaped substrate.

8. The method according to claim 7, wherein the first melt adhesive is applied at a temperature at which the adhesive has a viscosity of between 1000 and 20,000 mPas.

9. The method according to claim 8, wherein the second melt adhesive can be applied to the crosslinked first layer immediately after crosslinking.

10. The method according to claim 8, wherein an NCO-reactive polyurethane melt adhesive is used as a second melt adhesive.

11. The method according to claim 7, wherein the layer thickness of the UV-crosslinkable adhesive is between 1 and 5 mm, and is crosslinkable by exposure to UV radiation.

12. The method according to claim 11, wherein the layer of the UV-crosslinkable adhesive is crosslinked by irradiated for between 0.3 and 15 seconds with UV radiation.

* * * * *